United States Patent
Toth

(10) Patent No.: US 6,634,390 B2
(45) Date of Patent: Oct. 21, 2003

(54) INSULATION COVER

(76) Inventor: Peter R. Toth, 7911-118A Street, Edmonton, Alberta (CA), T6G 1V4

( * ) Notice: Subject to any disclaimer, the term of this patent is extended or adjusted under 35 U.S.C. 154(b) by 165 days.

(21) Appl. No.: 09/740,840

(22) Filed: Dec. 21, 2000

(65) Prior Publication Data

US 2002/0079011 A1 Jun. 27, 2002

(51) Int. Cl.[7] .................................................. F16L 9/14
(52) U.S. Cl. ........................ 138/146; 138/149; 138/158; 138/169
(58) Field of Search ............................. 138/146, 149, 138/158, 169

(56) References Cited

U.S. PATENT DOCUMENTS

| | | | |
|---|---|---|---|
| 3,557,840 A | * 1/1971 | Maybee ........................ 138/149 |
| 3,941,159 A | * 3/1976 | Toll ............................. 138/147 |
| 3,942,678 A | 3/1976 | Heydemann ................. 220/342 |
| 4,009,735 A | * 3/1977 | Pinsky ......................... 138/147 |
| 4,243,453 A | * 1/1981 | McClintock ................. 138/149 |
| 4,259,981 A | 4/1981 | Busse ........................... 137/375 |
| 4,287,245 A | * 9/1981 | Kikuchi ....................... 138/141 |
| 4,344,303 A | * 8/1982 | Kelly, Jr. ..................... 138/149 |
| 4,484,386 A | 11/1984 | Stonitsch ....................... 29/455 |
| 4,556,082 A | 12/1985 | Riley et al. .................. 137/375 |
| 4,696,324 A | 9/1987 | Petronko ...................... 137/375 |
| 4,748,060 A | * 5/1988 | Fry et al. ..................... 138/151 |
| 4,748,781 A | 6/1988 | Wencley ...................... 52/309.5 |
| 4,790,109 A | 12/1988 | Whidden ...................... 52/79.4 |
| 4,807,669 A | 2/1989 | Prestidge, Sr. ............. 138/178 |
| 4,978,690 A | 12/1990 | Hill ............................... 521/54 |
| 4,996,088 A | * 2/1991 | Knittel et al. ................ 138/149 |
| 5,025,836 A | 6/1991 | Botsolas ....................... 138/110 |
| 5,112,661 A | * 5/1992 | Pendergraft et al. ........ 138/149 |
| 5,181,353 A | 1/1993 | Harrington, Jr. ............. 52/79.1 |
| 5,192,039 A | * 3/1993 | Williams ...................... 138/149 |
| 5,310,594 A | * 5/1994 | Holland et al. .............. 138/137 |
| 5,381,638 A | 1/1995 | Andersson ................... 52/592.1 |
| 5,584,897 A | 12/1996 | Christianson et al. ........ 51/295 |
| 5,587,117 A | 12/1996 | Eisen et al. ................. 264/45.7 |
| 5,862,801 A | * 1/1999 | Wells ....................... 128/200.26 |

FOREIGN PATENT DOCUMENTS

| CA | 1249974 | 2/1989 |

* cited by examiner

*Primary Examiner*—James Hook
(74) *Attorney, Agent, or Firm*—Anthony R. Lambert

(57) ABSTRACT

A removable/reusable insulating cover includes an insulating material, a flexible and puncture resistant coating, a flap which is an extension of the coating and a hinge which is an integral part of the coating. The system provides a flexible yet durable insulation cover, which may be removed and reused.

13 Claims, 9 Drawing Sheets

INSULATION COVER

FIELD OF THE INVENTION

This invention relates to removable reusable insulation covers generally used for insulating structures such as valves and flanges.

BACKGROUND OF THE INVENTION

Structures used in industrial applications such as valves and flanges with sharp protrusions frequently require insulation. These objects often require inspection, thus necessitating frequent removal of the insulation. If permanent insulation is used on the object then each time the insulation is removed new insulation must be put back on. This is time consuming, sometimes difficult to schedule and in many instances prohibitively expensive. The most practical method to insulate these types of objects is to utilise a removable and reusable insulating jacket. There are a number of such systems available and they do insulate and are removable and reusable as required. An example is described in U.S. Pat. No. 4,807,669 issued Feb. 28, 1989, corresponding to Canadian patent no. 1,249,974 of Prestidge.

These systems in general include an insulating material, an outer covering to protect and keep the insulation dry and various fastening devices to seal and to secure the insulating jacket to the object. Some of the systems are flexible but not durable while some are durable but rigid. One type of system uses insulation covered with silicone impregnated fibreglass cloth. The inventor considers that the use of cloth renders the product liable to tearing during installation, hence is flexible at the expense of a decrease in durability.

Another type of system uses rigid insulation covered by sheet metal with the sections secured together with mechanical hinges, clasps or straps. Such a product is durable at the expense of loss of flexibility.

SUMMARY OF THE INVENTION

There is therefore provided an insulating cover that is designed to meet these problems, and thus provide an insulation cover that has enhance flexibility as compared with a metal cover, and enhanced durability when compared with a cloth cover. In accordance with a broad aspect of the invention there is provided a removable and reusable insulating cover for insulating an object with sharp protrusions.

According to one aspect of the invention there is provided an insulation cover comprising insulation coated with a coating material, for example completely coated, and a fastener attached to the coated insulation for removably securing the coated insulation to a structure to be insulated.

According to a further aspect of the invention, there is provided a method of installing an insulation cover. In such a method, there are provided the steps of obtaining insulation coated with a coating material; and removably attaching the coated insulation to a structure to be insulated.

According to a further aspect of the invention, there is provided a method of making an insulation cover. In such a method, there are provided the steps of applying coating material to insulation to form coated insulation; and attaching a fastener to the coated insulation for removably securing the coated insulation to a structure to be insulated.

Preferably, the insulation cover comprises a flap secured to the insulation, which is formed as part of the insulation cover and used as a support for the fastener.

The insulation may be provided as one or more segments of insulation, each individually coated, and which may be hinged together for example by one or more living hinges. Such a segmented hinged insulation cover is thus adapted to be wrapped around a structure and secured with the fastener.

The fastener may be formed of a first fastener and a second fastener, each secured to different parts of the insulation cover, the first fastener and second fastener being configured to secure to each other for wrapping the insulation cover around a structure to be insulated.

The coating, which is bonded to the insulation, seals and protects the insulation from damage. The flap prevents moisture from penetrating into a cavity formed by the insulating cover.

The insulation is preferably a closed cell flexible foam material; and the coating is preferably a sprayed on polyurethane polymer coating which possesses the properties of being flexible in a broad range of temperatures yet resistant to puncture.

Further features and advantages of the invention will appear from the description that follows.

BRIEF DESCRIPTION OF THE FIGURES

There will now be described preferred embodiments of the invention, with reference to the drawings, by way of illustration, in which like numerals denote like elements and in which.

DESCRIPTION OF THE PREFERRED EMBODIMENT

In this patent document, "comprising" means "including". In addition, a reference to an element by the indefinite article "a" does not exclude the possibility that more than one of the element is present. A coating is a film of material that covers and bonds to the underlying substrate. When application of a coating is referred to, or reference is made to coating, then this is preferably carried out by spraying of the coating, but may be painted on or applied in other ways such as by dipping the object in a liquid coating bath. The term "removable" when used in this patent document means removable without damaging the insulation cover.

Figure 1:
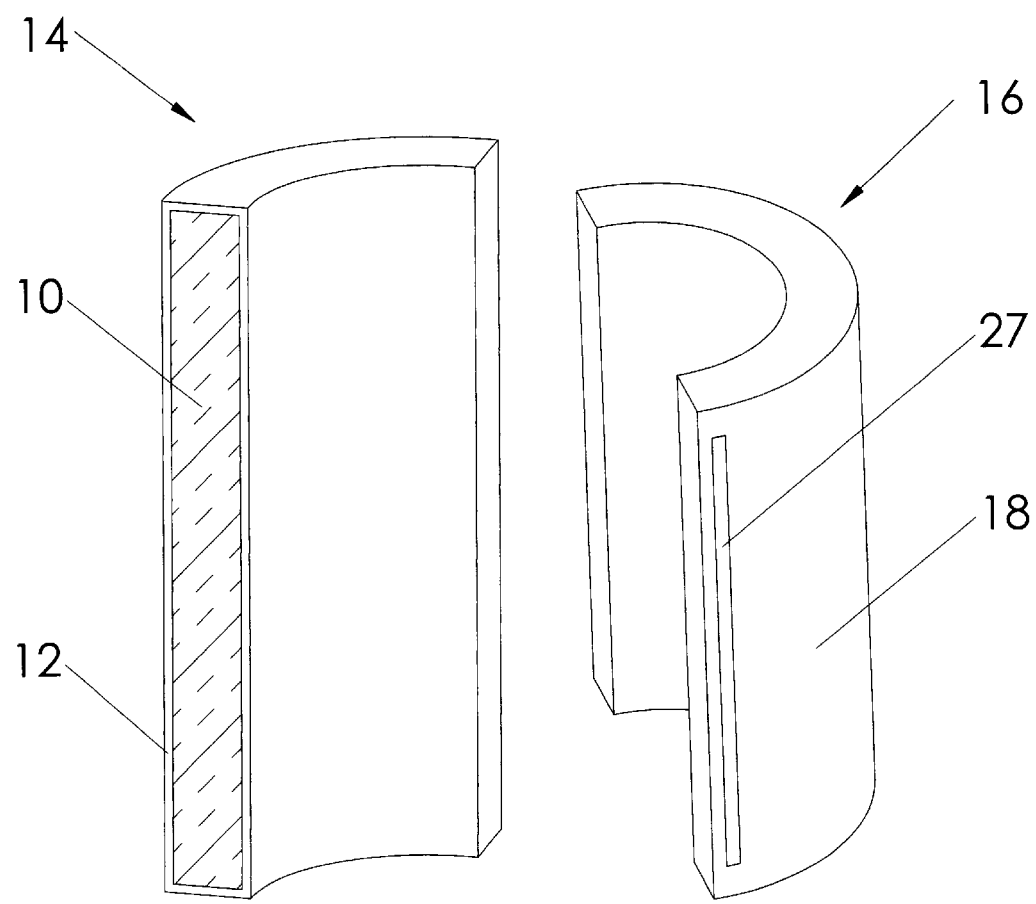
FIG. 1 shows a cross-section view of an insulation segment coated with an outer layer, together with a view of a second insulation segment.

Referring to FIG. 1 there is shown a cross-section of a semi-circular piece of insulation 10 coated with a first protective coating layer 12 thus creating an insulation segment 14 and a second semi-circular insulation segment 16 coated by a first protective coating layer 18. The preferred choice of insulation is ARMORFLEX™ insulation, which is commercially available from C & I Insulation of Edmonton, Alberta, Canada. The preferred choice of coating material is a polyether polyol such as HYDROSEAL™ polyurethane coating, which is commercially available from Hydroseal Polymers Incorporated, Riverside, Calif. The protective coating material is applied wherever it is deemed necessary to provide mechanical protection to the insulation. In one embodiment, the coating completely covers the insulation on all sides. In another embodiment, one face of the insulation may be left uncoated, with all remaining faces coated. The uncoated face may be the inner concave face of the insulation segment 16 shown in FIG. 1.

The thickness of the coating may be chosen to suit the intended application. A thicker coating is more durable, but less flexible. The coating should be sufficiently flexible when cured to allow bending of the insulation cover when it is wrapped around a structure. The coating should be resistant against corrosion caused by common industrial fluids such as solvents, hydrocarbons, acids and water. The coating should also be resistant against puncture by protrusions from a structure and resistant against abrasion. Various polymeric resins may be used, preferably polyurethane. Preferred polymeric resins that may be used have similar durability and flexibility as polyurethane.

Figure 2:
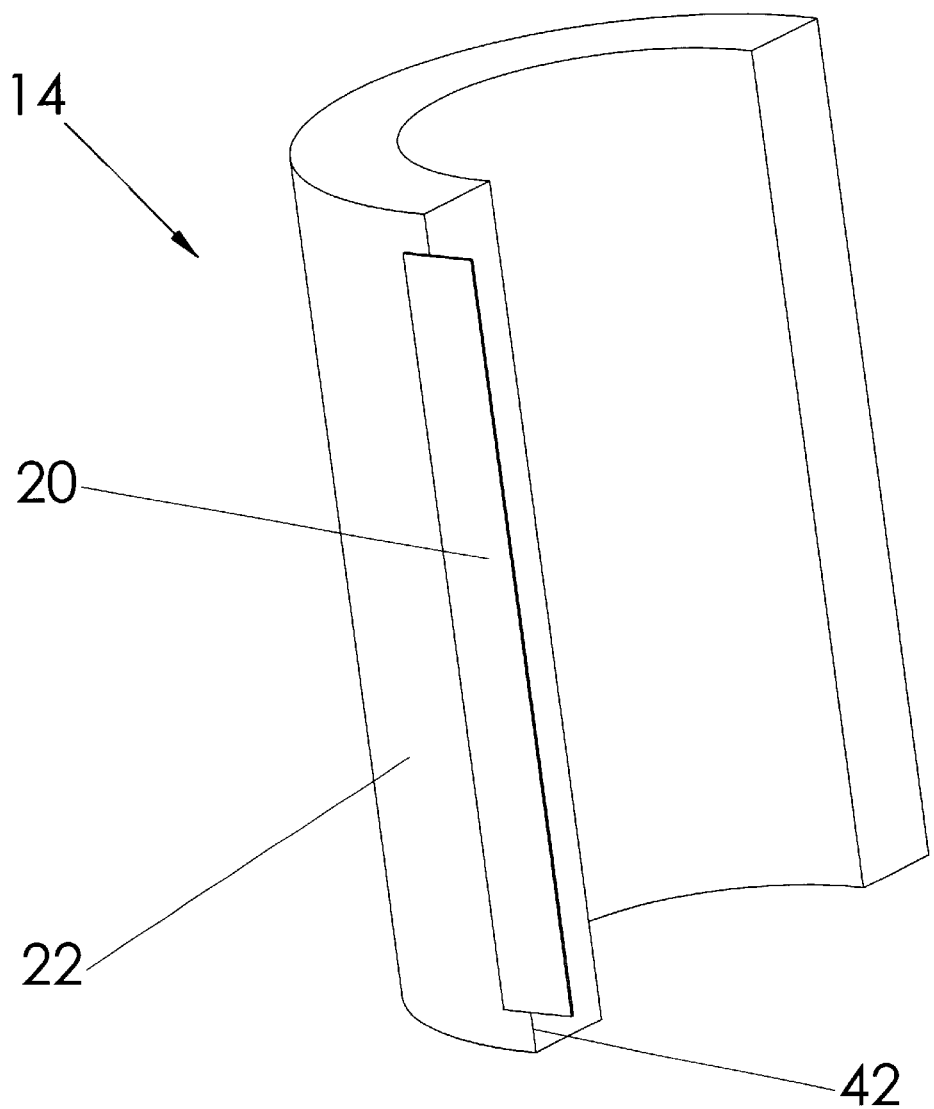
FIG. 2 shows a perspective view of insulation segment 14 of FIG. 1, with a strip of tape extending over one edge of the insulation segment.
Figure 3:
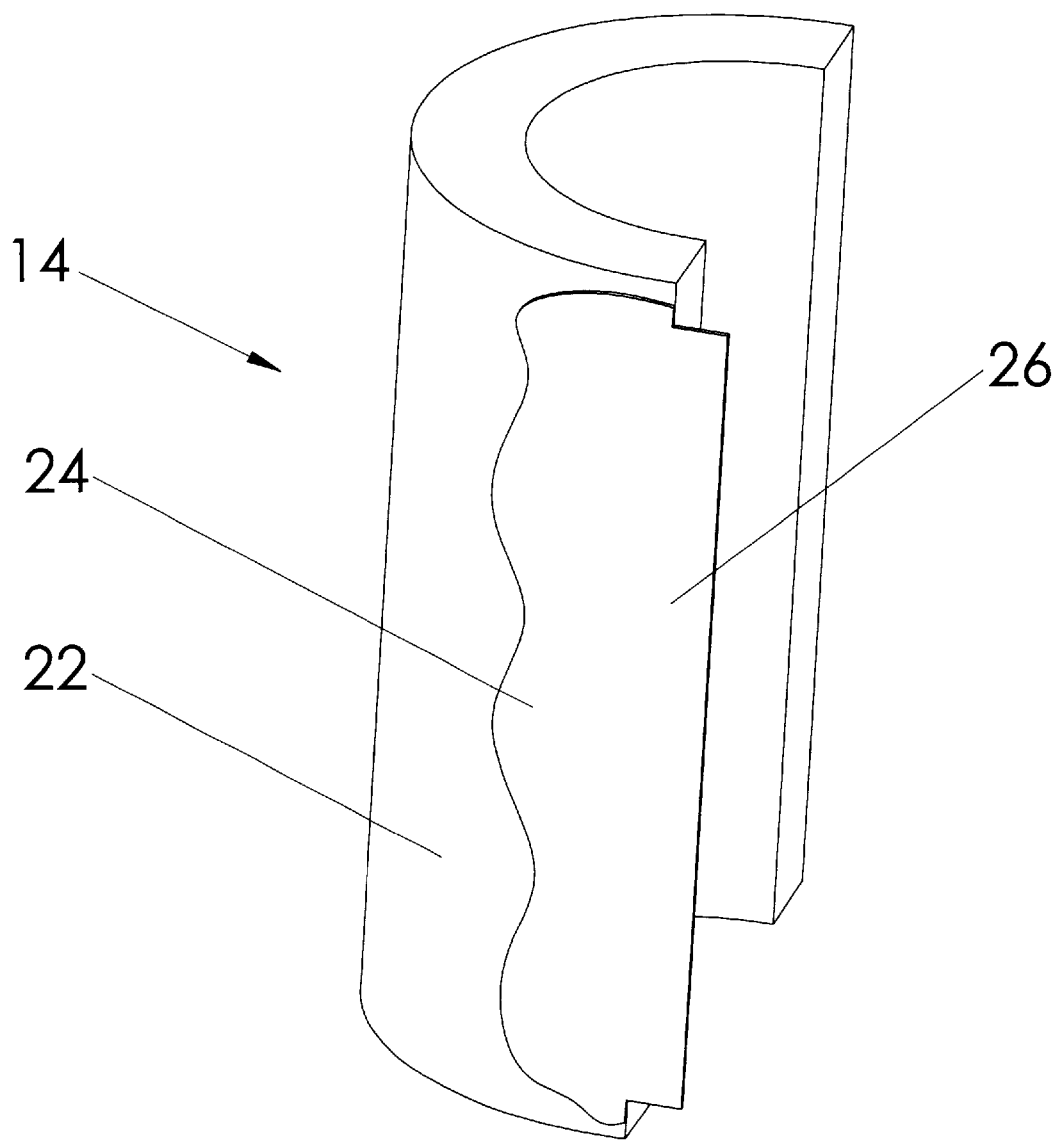
FIG. 3 shows a perspective view of insulation segment 14 of FIG. 2 with a layer of coating applied over the tape strip and extending onto the first layer of coating.
Figure 3A:
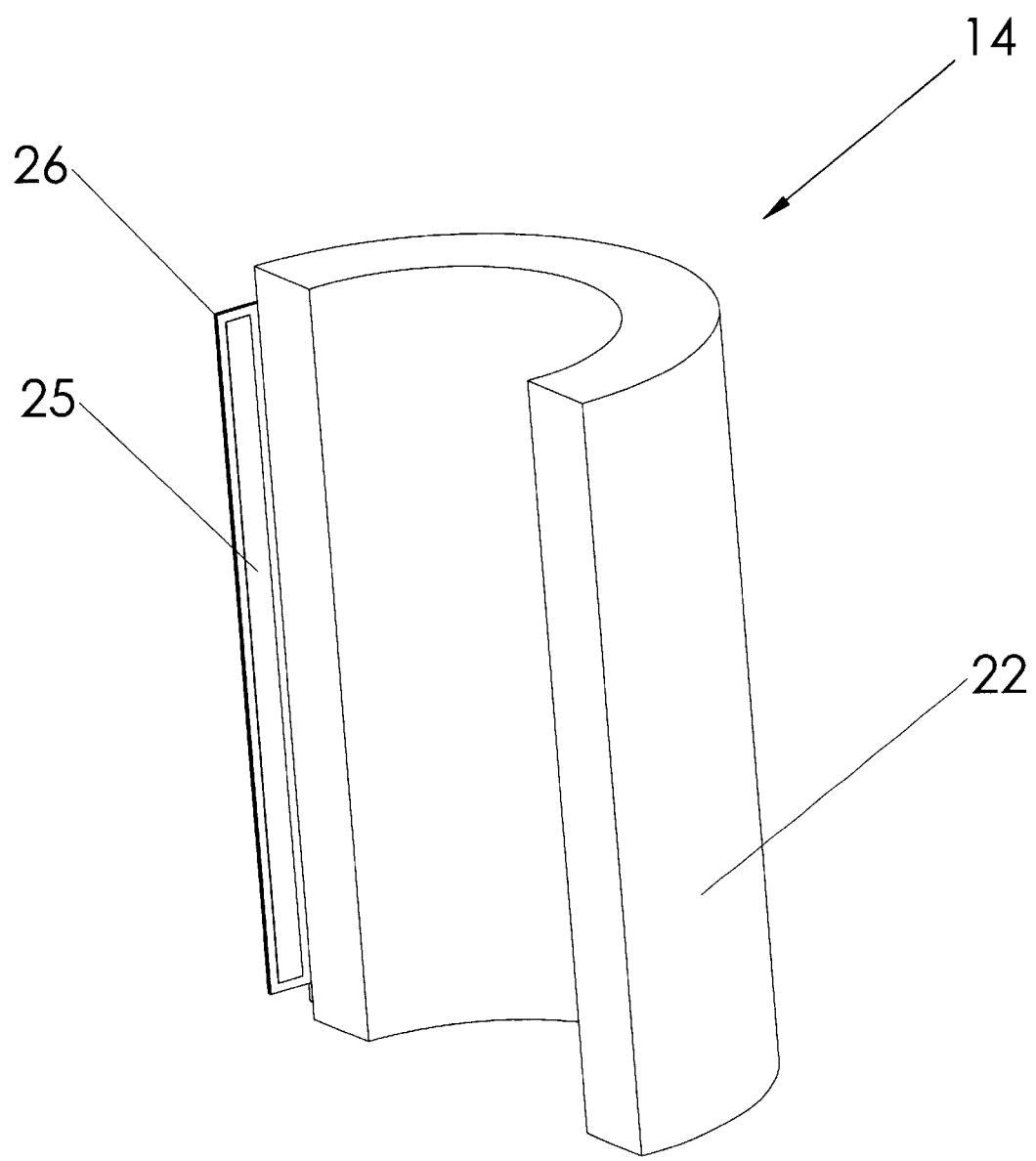
FIG. 3A shows an insulation segment with a fastener on the inside surface of a flap.

Referring to FIGS. 2, 3 and 3A, a strip of tape 20 is applied to surface 22 of insulation segment 14 such that part of the tape overhangs past the edge 42. The tape is preferably duct tape commercially available from Canadian Tire of Edmonton, Alberta, Canada. A coating layer 24 is applied over a portion of surface 22 and over tape 20. The coating over the tape 20 creates a flap 26, and the tape 20 may be removed if desired, leaving the flap 26. A fastener 25 is attached to the inner surface of flap 26 such as by adhesive. The fastener 25 is selected to mate with a complementary fastener 27 on the outer surface of insulation segment 16. The fasteners 25 and 27 may be hook and loop type fasteners (Velcro™) or may be any other fastener system that allows the insulation cover to be removably attached to a structure. Examples of detachable fasteners include buttons, zips, cord laced through holes in flaps and large size hook and ring combinations. A single fastener may be used as shown in FIG. 1. The single fastener may be attached to the surface of an insulated coating for attaching, for example, an insulation cover according to the invention over an opening in a wall. In this case, the wall has a complementary fastener attached to it. The fastener of this example may run around the periphery of a rectangular segment of coated insulation, with the complementary fastener of the wall running around the opening intended to be covered. Flaps 26 with fasteners 25 may be created along all peripheral edges of the insulation cover. Adjacent insulation cover segments are attached to each other by respective fasteners on the flaps to form an interior cavity. The complete unit is wrapped around a structure with the structure in the interior cavity. The flaps protect the interior cavity and the structure from ingress of liquids.

Figure 4:
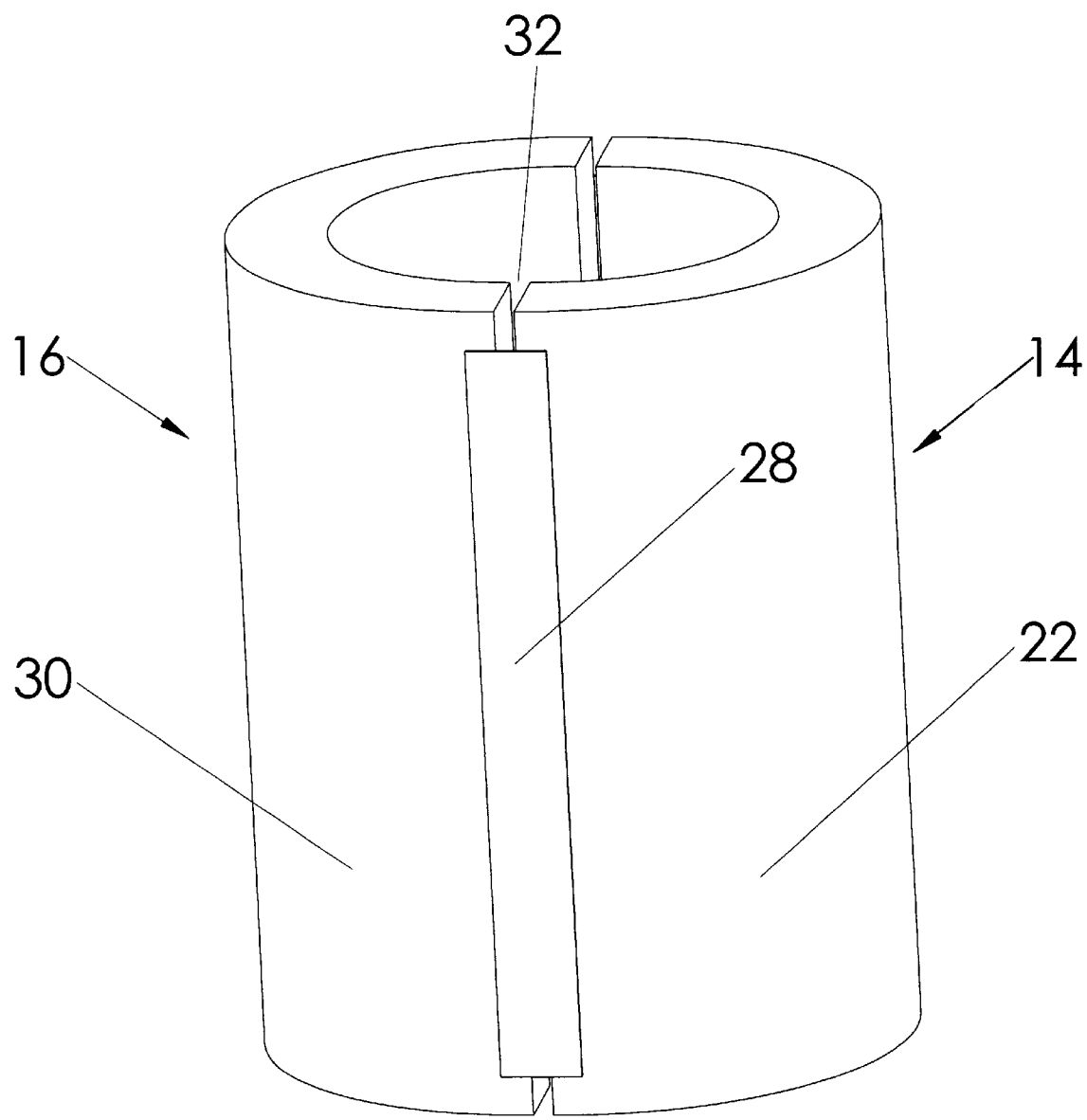
FIG. 4 shows a perspective view of two segments of coated insulation joined by a first strip of tape.
Figure 5:
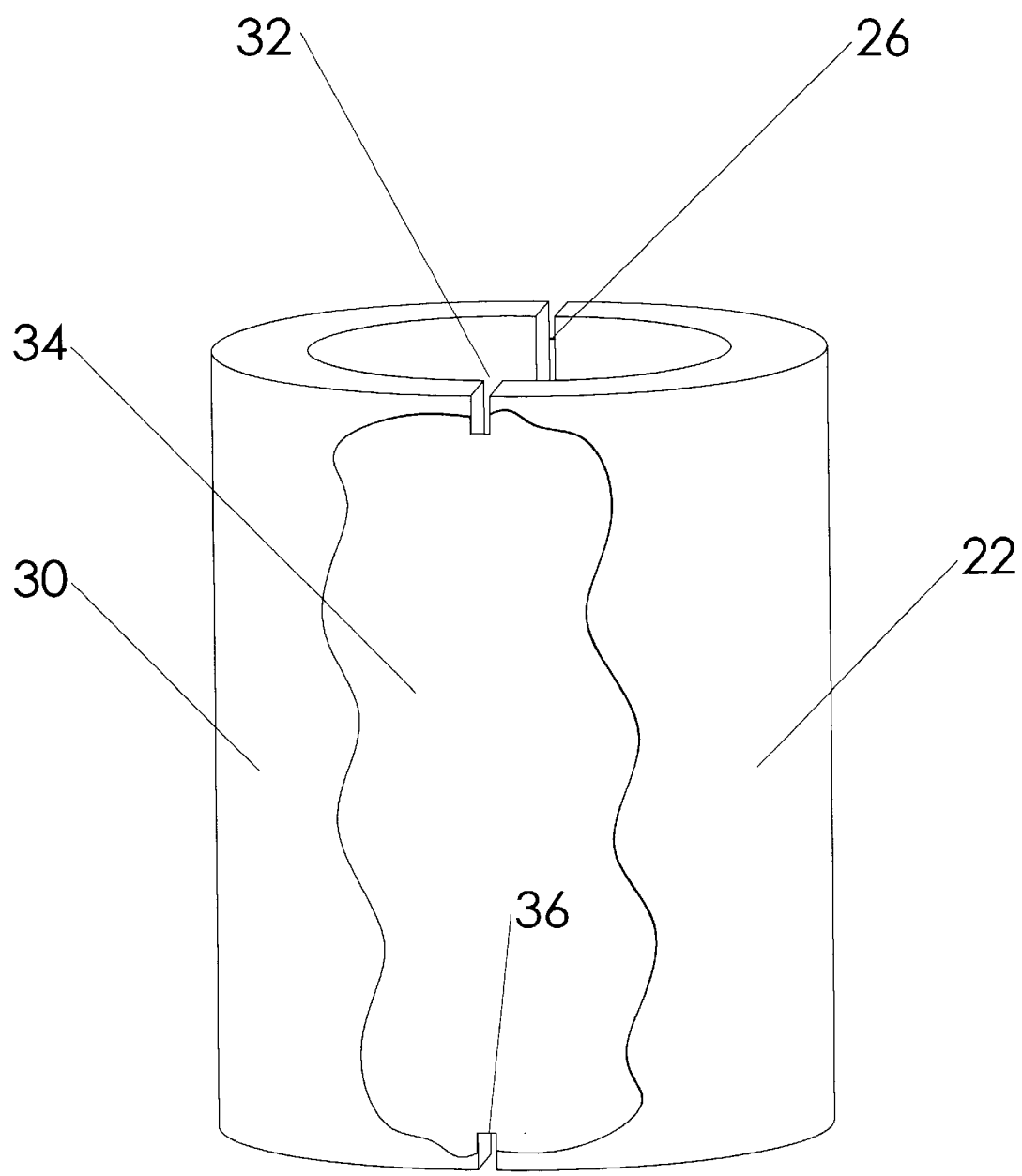
FIG. 5 shows a perspective view of the two insulation segments of FIG. 4 with a layer of coating applied over the tape strip and extending onto the first layer of coating.
Figure 8:
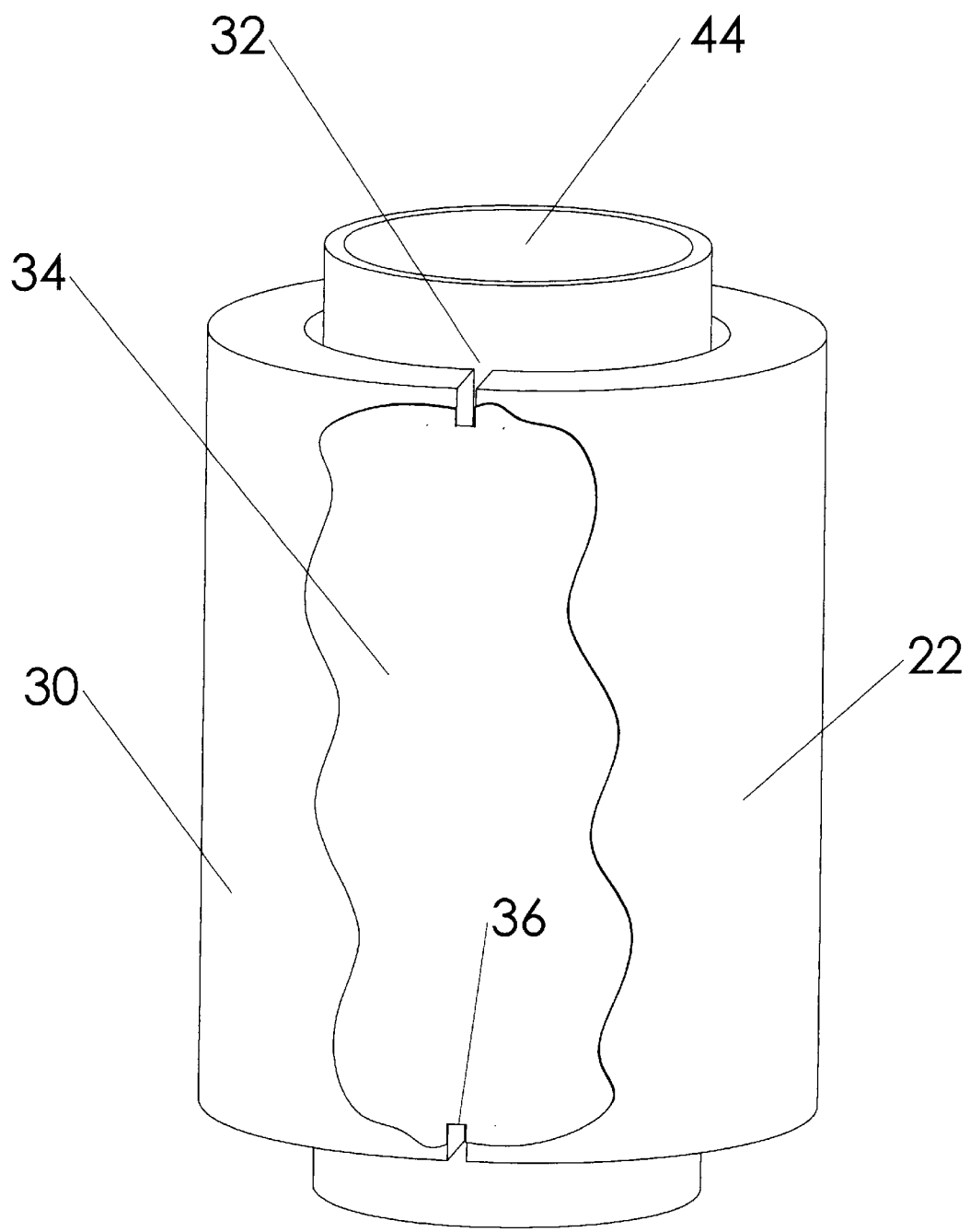
FIG. 8 shows an embodiment of the invention wrapped around a structure.

Referring to FIGS. 4 and 5, a strip of tape 28 is applied to surface 22 of insulation segment 14 and surface 30 of insulation segment 16 such that the tape 28 bridges the gap 32 between the two surfaces 22 and 30. A coating layer 34 is applied over a portion of surfaces 22 and 30 and over tape 28 to create a living hinge. The tape 28 may then be removed. This embodiment is particularly suited to wrapping the insulation cover around a structure 44 as illustrated in FIG. 8. The segments 14 and 16 are shown as round, but they may be shaped to map the shape of the structure around which they are wrapped. The structure 44 may be any commercial apparatus requiring insulation, such as a valve, flange, tank, pipe or electrical box.

Figure 6:
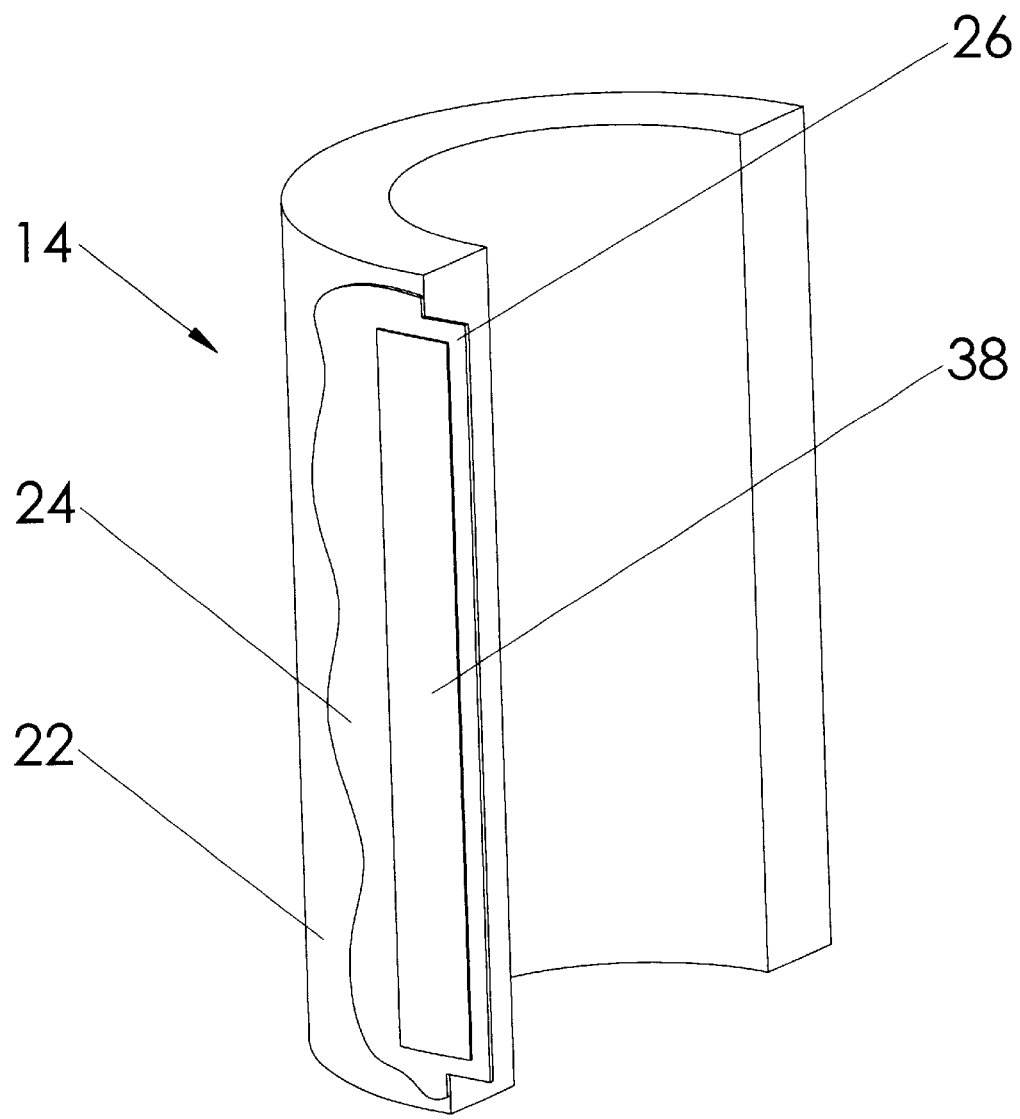
FIG. 6 shows a perspective view of an insulation segment with a strip of fiberglass weave cloth applied in position over the coated tape strip.
Figure 7:
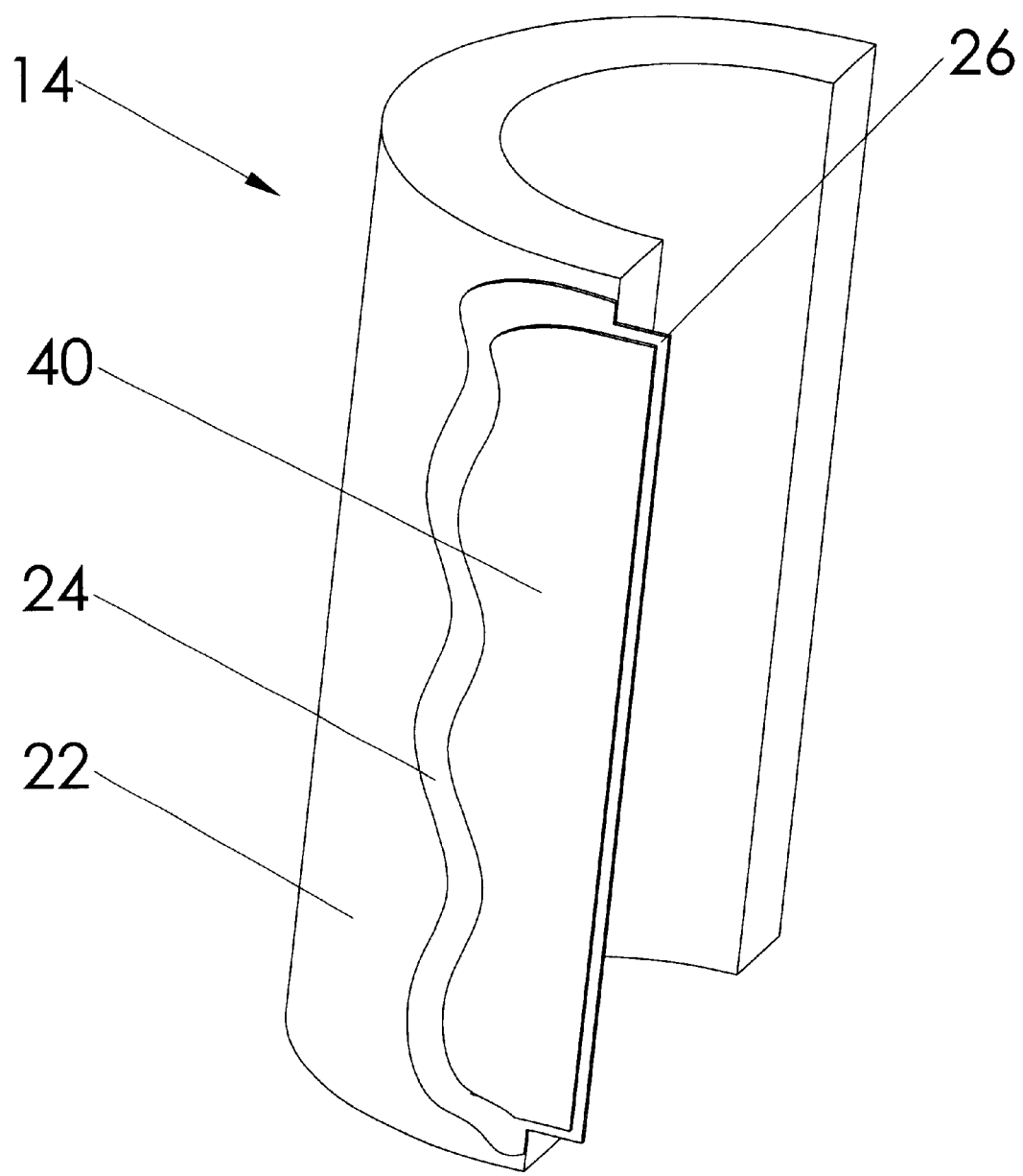
FIG. 7 shows the embodiment of FIG. 6 in which the fiberglass is covered by coating material.

Referring to FIGS. 6 and 7, the insulation cover may be strengthened using fibreglass. A strip of fibreglass weave 38, may be applied proximately to the tape strip 20 on the surface of coating layer 24 in order to reinforce the flap 26. A coating layer 40 is applied on top of coating layer 22 and on top of fibreglass weave strip 38. Alternatively the fibreglass weave strip may be applied proximately next to tape strip 20 prior to the application of coating layer 24, thus eliminating the requirement for coating layer 40. Hinge 36 may be reinforced in a similar fashion by following the same procedure as outlined for flap 26.

Some advantages of the present invention are that the coating layer acts to hold the form of the insulation in the desired shape, protects the insulation from damage due to contact with sharp objects and prevents the insulation from losing its insulation value by preventing the ingress of water. The combination of the insulation coated with the protective outer layer creates a flexible yet durable insulation cover which may be bent without fear of damaging the cover and which may come into contact with sharp protrusions without fear of penetrating the outer covering and thereby exposing the insulation to the elements.

A person skilled in the art could make immaterial modifications to the invention described and claimed in this patent disclosure without departing from the essence of the invention.

I claim:

1. An insulation cover for a structure, comprising:
    a first segment of insulation having an exterior surface;
    a second segment of insulation having an exterior surface and the second segment of insulation abutting the first segment of insulation;
    sprayed on coating material covering the first segment of insulation and the second segment of insulation, the coating material forming a living hinge that forms a bridge between the exterior surfaces of the first segment and second segment; and
    a fastener attached to the first segment of insulation and attachable to the second segment of insulation for removably securing the insulation to a structure to be insulated.

2. The insulation cover of claim 1 in which the bridge comprises a strip of tape coated with coating material.

3. The insulation cover of claim 1 installed around a structure.

4. The insulation cover of claim 1 in which the fastener comprises a flap formed by coating a strip of tape with coating material.

5. The insulation cover of claim 1 in which the coating material is made from a polymeric resin having the durability and flexibility of polyurethane.

6. A method of insulating a structure, comprising the steps of:
    creating a hinge between a first segment of insulation and a second segment of insulation by (1) applying a strip of tape to form a bridge between the first segment of insulation and the second segment of insulation and (2) coating the strip of tape with coating material; and fastening the first segment of insulation and the second segment of insulation around a structure to be insulated with a fastener.

7. The method of claim 6 in which the fastener comprises a flap formed by coating a tape with coating material.

8. The method of claim 6 in which the coating material is made from a polymeric resin having the durability and flexibility of polyurethane.

9. The method of claim 6 in which coating the strip of tape comprises spraying coating material onto the strip of tape.

10. A method of creating an insulation cover for a structure, the method comprising the steps of:

creating a hinge between a first segment of insulation and a second segment of insulation by (1) applying a strip of tape to form a bridge between the first segment of insulation and the second segment of insulation and (2) coating the strip of tape with coating material; and providing a fastener for securing the first segment of insulation and the second segment of insulation around a structure to be insulated with a fastener.

11. The method of claim 10 in which providing the fastener comprises forming a flap by coating a tape with coating material.

12. The method of claim 10 in which the coating material is made from a polymeric resin having the durability and flexibility of polyurethane.

13. The method of claim 10 in which coating the strip of tape comprises spraying coating material onto the strip of tape.

* * * * *